United States Patent
Hepworth et al.

(10) Patent No.: US 7,036,735 B2
(45) Date of Patent: May 2, 2006

(54) GRAPHICAL CODE READER HAVING ILLUMINATION LEDS OF DIFFERENT WAVELENGTHS

(75) Inventors: Paul J. Hepworth, Riverton, UT (US); George Powell, Sandy, UT (US); Ryan Hyde, Draper, UT (US)

(73) Assignee: The Code Corporation, Draper, UT (US)

( * ) Notice: Subject to any disclaimer, the term of this patent is extended or adjusted under 35 U.S.C. 154(b) by 81 days.

(21) Appl. No.: 10/761,949

(22) Filed: Jan. 21, 2004

(65) Prior Publication Data

US 2005/0199719 A1    Sep. 15, 2005

(51) Int. Cl.
*G06K 7/14* (2006.01)
*G06K 7/10* (2006.01)

(52) U.S. Cl. .................... 235/454; 235/468

(58) Field of Classification Search ........... 235/454, 235/472.01, 462.01, 468
See application file for complete search history.

(56) References Cited

U.S. PATENT DOCUMENTS

| | | | |
|---|---|---|---|
| 4,816,659 A * | 3/1989 | Bianco et al. | 235/462.21 |
| 5,248,872 A * | 9/1993 | Stewart | 235/468 |
| 5,504,317 A | 4/1996 | Takahashi | |
| 5,621,202 A * | 4/1997 | Aoki | 235/454 |
| 5,723,868 A | 3/1998 | Hammond, Jr. et al. | |
| 6,073,852 A * | 6/2000 | Seo | 235/472.01 |
| 6,607,128 B1 | 8/2003 | Schwartz et al. | |

\* cited by examiner

*Primary Examiner*—Karl D. Frech
*Assistant Examiner*—Lisa M. Caputo
(74) *Attorney, Agent, or Firm*—Madson & Austin (57) ABSTRACT

A graphical code reader is described herein. The graphical code reader includes an infrared light-emitting diode and a red light-emitting diode. The graphical code reader also includes an image sensor. A lens is positioned to focus reflected light on the image sensor. The graphical code reader also includes a processor and memory in electronic communication with the processor. Instructions are stored in the memory. The instructions are executable by the processor to implement a method that involves illuminating the infrared light-emitting diode at an infrared illumination intensity level and illuminating the red light-emitting diode at a red illumination intensity level. The method also involves capturing a digital image for processing. The digital image is an electronic representation of an optical image formed on the image sensor. The method also involves processing the digital image to attempt to decode a graphical code within the digital image.

18 Claims, 10 Drawing Sheets

GRAPHICAL CODE READER HAVING ILLUMINATION LEDS OF DIFFERENT WAVELENGTHS

TECHNICAL FIELD

The present invention relates generally to graphical code readers. More specifically, the present invention relates to improved illumination techniques in image-based graphical code readers.

BACKGROUND

A machine-readable graphical code ("graphical code") is a graphical representation of information that consists of multiple graphical code elements having different light reflective or light emissive properties. Examples of different types of graphical codes include bar codes, data matrix codes, MaxiCodes, optical character recognition ("OCR") text, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. A lens within the graphical code reader focuses an image of the graphical code onto an image sensor over a period of time commonly referred to as an exposure period. Following the exposure period, pixels within the image sensor are read electronically to provide a two-dimensional array of image data corresponding to the graphical code. The image data is then multiplied by a gain. A decoder processes the gain-adjusted image data and extracts the information contained in the graphical code.

One issue that arises in connection with image-based graphical code readers relates to the light sources that are used for illumination. Light-emitting diodes (LEDs) are commonly used for illumination in image-based graphical code readers. The LEDs typically emit red light, i.e., light that is perceived by the human eye as including the color red. However, in some situations, the red LEDs do not project illumination sufficiently far to enable operation of the graphical code reader at a desired distance from the graphical code. Also, because the illumination projected by the red LEDs is visible to the human eye, the red illumination can appear uncomfortably bright to the user of the graphical code reader.

Another issue that often arises in connection with image-based graphical code readers relates to the brightness of the images that are captured. If the images are too bright or too dark, then there may not be sufficient contrast to enable the decoder to identify a graphical code within the image. In the traditional imaging environment, brightness is adjusted by varying one or both of two variables, the gain and the exposure time. However, increasing the gain has the undesirable effect of amplifying the noise. Increasing the exposure time makes the digital images that are captured more susceptible to motion blur.

In view of the foregoing, benefits may be realized by improved illumination techniques in an image-based graphical code reader.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A graphical code reader is disclosed. The graphical code reader includes an infrared light-emitting diode and a red light-emitting diode. The graphical code reader also includes an image sensor and a lens. The lens is positioned to focus reflected light on the image sensor. The graphical code reader also includes a processor and memory in electronic communication with the processor. Instructions are stored in the memory. The instructions are executable by the processor to implement a method that involves illuminating the infrared light-emitting diode at an infrared illumination intensity level and illuminating the red light-emitting diode at a red illumination intensity level. The method also involves capturing a digital image for processing. The digital image is an electronic representation of an optical image formed on the image sensor. The method also involves processing the digital image to attempt to decode a graphical code within the digital image.

In some embodiments, the method may also involve detecting user input. Illumination information may be obtained from the user input. The infrared illumination intensity level may be set in accordance with the illumination information. The red illumination intensity level may also be set in accordance with the illumination information.

In some embodiments, the method may also involve determining a brightness of the digital image and determining a desired brightness of the digital image. A difference signal may be determined which indicates a difference between the brightness of the image and the desired brightness of the digital image. The infrared illumination intensity level may be adjusted in proportion to the difference signal. The red illumination intensity level may also be adjusted in proportion to the difference signal.

The infrared light-emitting diode may emit infrared light having a wavelength band that is substantially centered at 700 nanometers. Alternatively, the infrared light-emitting diode may emit infrared light having a wavelength band that is substantially centered at 735 nanometers. The red light-emitting diode may emit infrared light having a wavelength band that is substantially centered at 660 nanometers.

Another embodiment of a graphical code reader is also disclosed. The graphical code reader includes an infrared light-emitting diode and a red light-emitting diode. The graphical code reader also includes a near field and a far field. The near field includes a near-field image sensor region and a near-field lens positioned to focus first reflected light on the near-field image sensor region. The far field includes a far-field image sensor region and a far-field lens positioned to focus second reflected light on the far-field image sensor region. A first distance between the near-field lens and the near-field image sensor region is greater than a second distance between the far-field lens and the far-field image sensor region. The graphical code reader also includes a processor and memory in electronic communication with the processor. Instructions are stored in the memory. The instructions are executable by the processor to implement a method that involves illuminating the infrared light-emitting diode at an infrared illumination intensity level and illuminating the red light-emitting diode at a red illumination intensity level. The method also involves obtaining a digital image. The digital image is an electronic representation of an optical image formed on at least one of the near-field image sensor region and the far-field image sensor region. The method also involves processing the digital image to attempt to decode a graphical code within the digital image.

In some embodiments, the method may also involve determining which of the near field and the far field is being used to read the graphical code. If the near field is being used to read the graphical code, the method may involve reducing the infrared illumination intensity level below the red illumination intensity level. If the far field is being used to read the graphical code, the method may involve increasing the infrared illumination intensity level.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Some of the embodiments described herein include one or more software modules. A software module, as that term is used herein, may include any type of computer instruction or computer executable code located within a memory device and/or transmitted as electronic signals over a system bus or network. A software module may comprise a single instruction, or many instructions, and may be distributed over several different code segments, among different programs, and across several memory devices.

Figure 1:
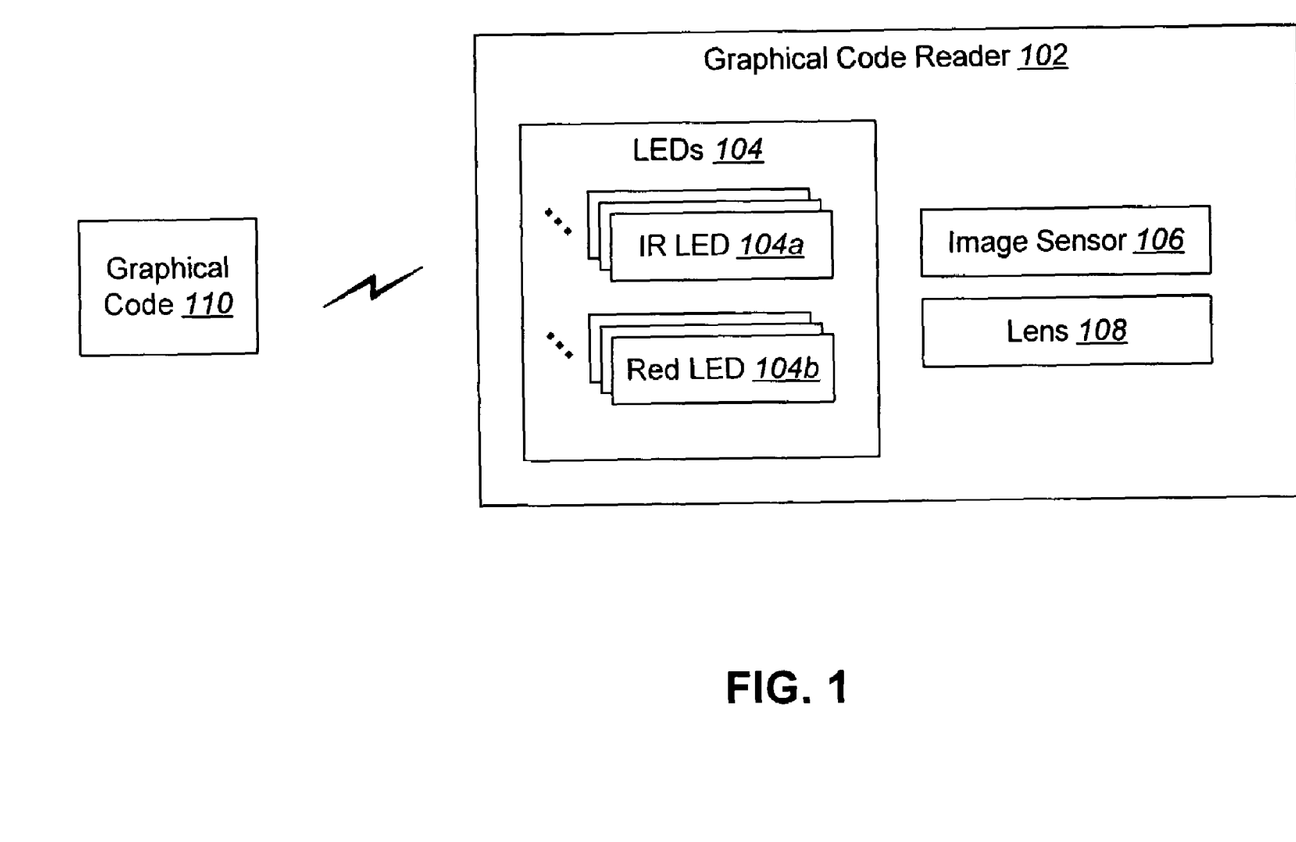
FIG. 1 is a block diagram illustrating physical components in an embodiment of a graphical code reader.

FIG. 1 is a block diagram illustrating physical components in an embodiment of a graphical code reader 102. The graphical code reader 102 includes a plurality of LEDs 104 that provide illumination. One or more of the LEDs 104 emit IR light and will be referred to as IR LEDs 104a. One or more of the LEDs 104 emit red light and will be referred to as red LEDs 104b. As used herein, the term "IR light" refers to light having a wavelength band that at least partially falls within the infrared portion of the electromagnetic spectrum. The term "red light" refers to light that is perceived by the human eye as including the color red.

The selection of the IR LEDs 104a is typically based upon a consideration of several factors, including cost, availability, and the sensitivity of the image sensor 106 that is to be used. In some embodiments, the IR LEDs 104a are selected to emit light having a wavelength band that is substantially centered at 735 nanometers. Alternatively, the IR LEDs 104a may be selected to emit light having a wavelength band that is substantially centered at 700 nanometers. The characteristics of the IR LEDs 104a in these two wavelength bands typically provide the best tradeoff between the above factors. In some embodiments, the red LEDs 104b may be selected to emit light having a wavelength band that is substantially centered at 660 nanometers.

The graphical code reader 102 also includes an image sensor 106. The image sensor 106 is a solid-state photodetecting device containing a relatively large number of light-sensitive pixels that are arranged in horizontal rows and vertical columns. Examples of different types of image sensors 106 that may be used with embodiments disclosed herein include charge coupled devices (CCDs), complementary metal oxide semiconductor (CMOS) devices, and so forth.

The graphical code reader 102 also includes a lens 108. In typical operation, when the LEDs 104 are activated, the graphical code reader 102 is positioned so that illumination from the LEDs 104 is directed toward a graphical code 110. The lens 108 is typically positioned so as to focus light reflected from the graphical code 110 onto the image sensor 106, thereby forming an optical image of the graphical code 110 on the image sensor 106.

In a graphical code reader 102, IR LEDs 104a possess several advantages relative to red LEDs 104b. For example, some image sensors 106 are more sensitive to IR illumination than to red illumination. In addition, an IR LED 104a is typically brighter in its band than a red LED 104b of the same size or power. Consequently, IR LEDs 104a generally project illumination farther and brighter than red LEDs 104b. The brightness of IR LEDs 104a relative to red LEDs 104b may be especially useful in a reader 102 that includes a CMOS image sensor 106, because CMOS image sensors 106 are not as sensitive to light as CCD image sensors 106. Another advantage of IR LEDs 104a relative to red LEDs 104b is that IR illumination is not visible to the human eye, whereas red illumination is quite bright. Consequently, it may be ergonomically more pleasing to use a graphical code reader 102 that projects IR illumination as opposed to red illumination. Another advantage of the IR LEDs 104a relates to the fact that the graphical code reader 102 may include a filter (not shown) for filtering the ambient light. The filter may filter some of the red illumination from the red LEDs 104b. However, such filters typically pass all of the IR illumination from the IR LEDs 104a.

Despite the advantages of IR LEDs 104a, it is generally desirable to include red LEDs 104b in a graphical code reader 102 in addition to the IR LEDs 104a. Some inks that are used to print certain types of graphical codes 110 reflect IR illumination very well. If graphical codes 110 printed with such inks are illuminated with IR LEDs 104a, the graphical codes 110 appear all white in an image that is captured by the reader 102. In contrast, most inks that are used to print graphical codes 110 absorb red illumination. Consequently, a reader 102 that uses red LEDs 104b will be able to read most graphical codes 110. Because IR LEDs 104a are advantageous in some circumstances and red LEDs 104b are advantageous in others, the graphical code readers 102 described herein use combinations of the IR LEDs 104a and the red LEDs 104b at different levels under different conditions.

Figure 2:
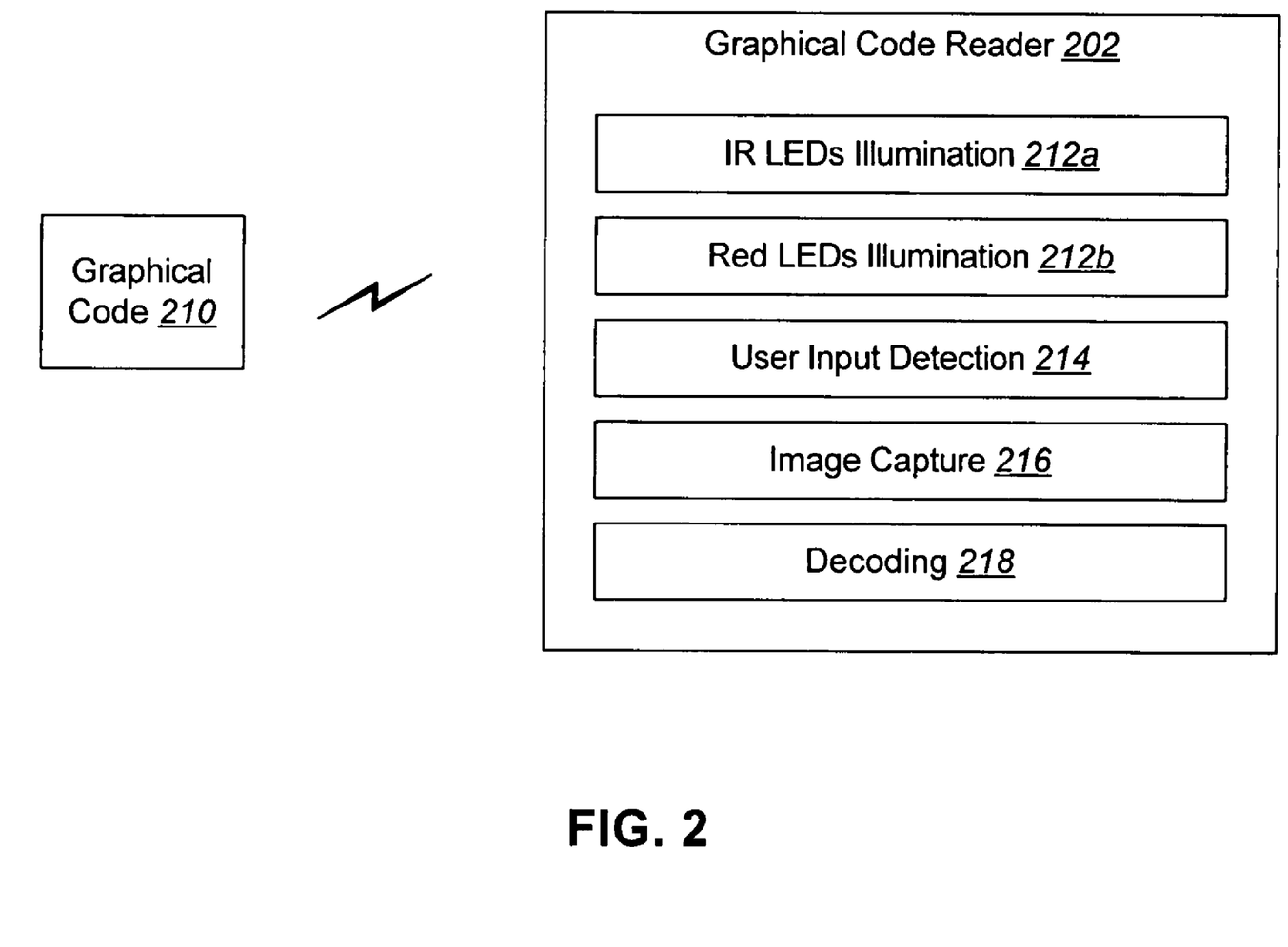
FIG. 2 is a block diagram illustrating software modules in an embodiment of a graphical code reader.

FIG. 2 is a block diagram illustrating software modules in an embodiment of a graphical code reader 202. As shown, the graphical code reader 202 includes an IR LEDs illumination module 212a and a red LEDs illumination module 212b. The IR LEDs illumination module 212a includes executable instructions for illuminating the IR LEDs 104a. The red LEDs illumination module 212b includes executable instructions for illuminating the red LEDs 104b. The intensity level at which the IR LEDs 104a are illuminated will be referred to herein as the IR illumination intensity level. The intensity level at which the red LEDs 104b are illuminated will be referred to herein as the red illumination intensity level.

In the illustrated embodiment, a user of the graphical code reader 202 selects the type of illumination that is used. More specifically, the user inputs information which is used by the reader 202 to set the IR illumination intensity level and the red illumination intensity level. The graphical code reader 202 includes a user input detection module 214. The user input detection module 214 includes executable instructions for detecting and obtaining illumination information from the user's input. The illumination information is used to set the IR illumination intensity level and/or the red illumination intensity level.

In typical operation, if the user knows that the graphical codes 210 that are being read are printed with inks that reflect IR illumination, the user may set the red illumination intensity level higher than the IR illumination intensity level. The IR illumination intensity level may be set to zero (i.e., all of the IR LEDs 104a may be turned off). In contrast, if the user knows that the graphical codes 210 that are being read are printed with inks that absorb IR illumination, the user may set the IR illumination intensity level higher than the red illumination intensity level.

The graphical code reader 202 also includes an image capture module 216. The image capture module 216 includes executable instructions for capturing a digital image for processing. As discussed above, in typical operation, the graphical code reader 202 is positioned so that illumination from the LEDs 104 in the reader 202 is directed toward a graphical code 210. Light is reflected from the graphical code 210 onto the image sensor 106, thereby forming an optical image of the graphical code 210 on the image sensor 106. In such embodiments, the image capture module 216 includes executable instructions for reading the light-sensitive pixels in the image sensor 106 to obtain a digital image, i.e., an electronic representation of the optical image that is formed on the image sensor 106.

The graphical code reader 202 also includes a decoding module 218. The decoding module 218 includes executable instructions for processing digital images. Processing a digital image typically involves searching for graphical code symbols within the image and decoding the graphical code symbols that are found. In typical embodiments, a graphical code 210 is decoded when a certain number of graphical code symbols are found and decoded within the same image.

Figure 3:
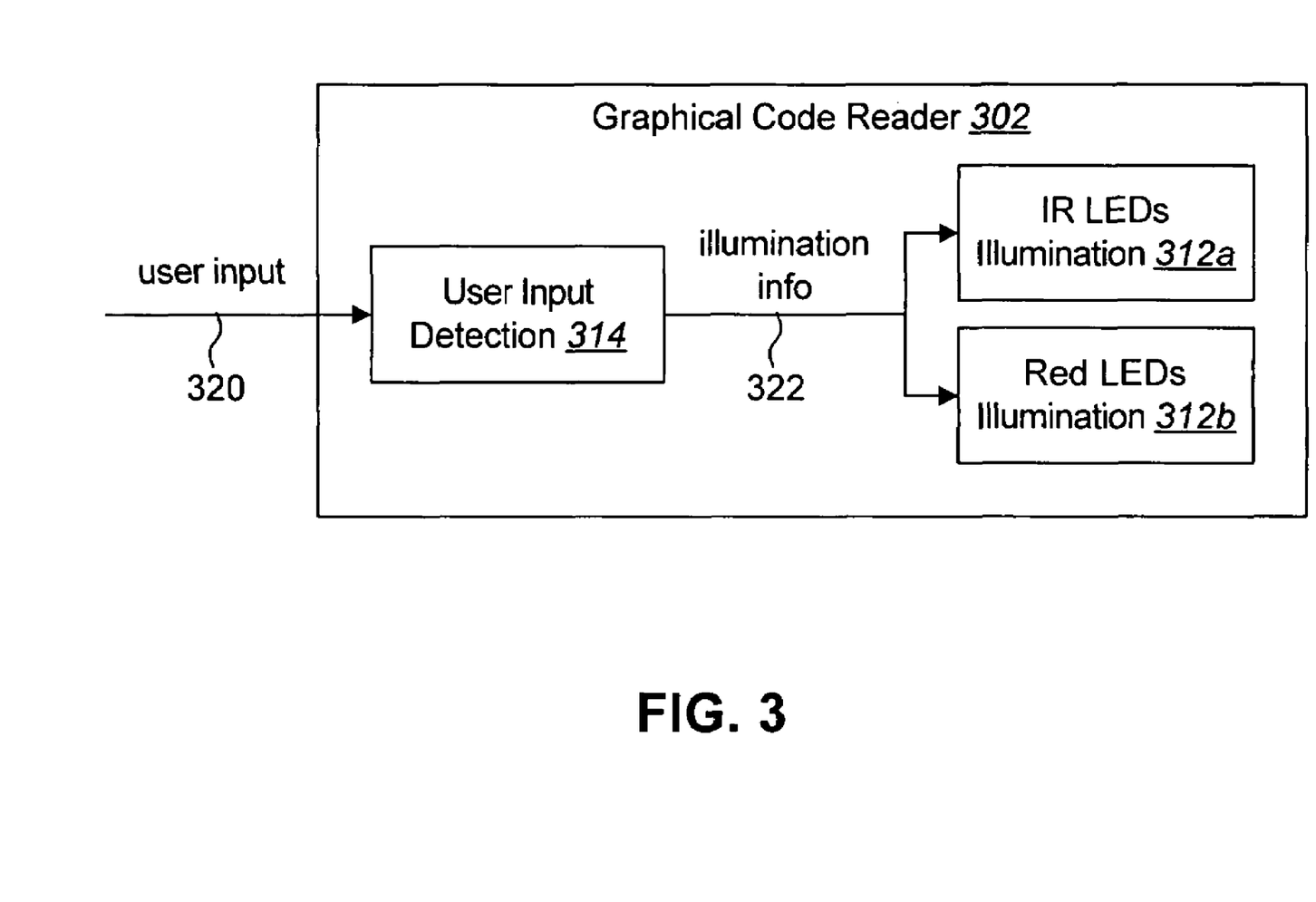
FIG. 3 is a signal flow diagram illustrating exemplary interaction between various software modules in an embodiment of the graphical code reader during typical operation.

FIG. 3 is a signal flow diagram illustrating exemplary interaction between various software modules in an embodiment of the graphical code reader 302 during typical operation. The user input detection module 314 detects user input 320. Illumination information 322 is obtained from the user input 320 and provided to the IR LEDs illumination module 312a and to the red LEDs illumination module 312b. The IR LEDs illumination module 312a sets the IR illumination intensity level in accordance with the illumination information 322. Similarly, the red LEDs illumination module 312b sets the red illumination intensity level in accordance with the illumination information 322.

Figure 4:
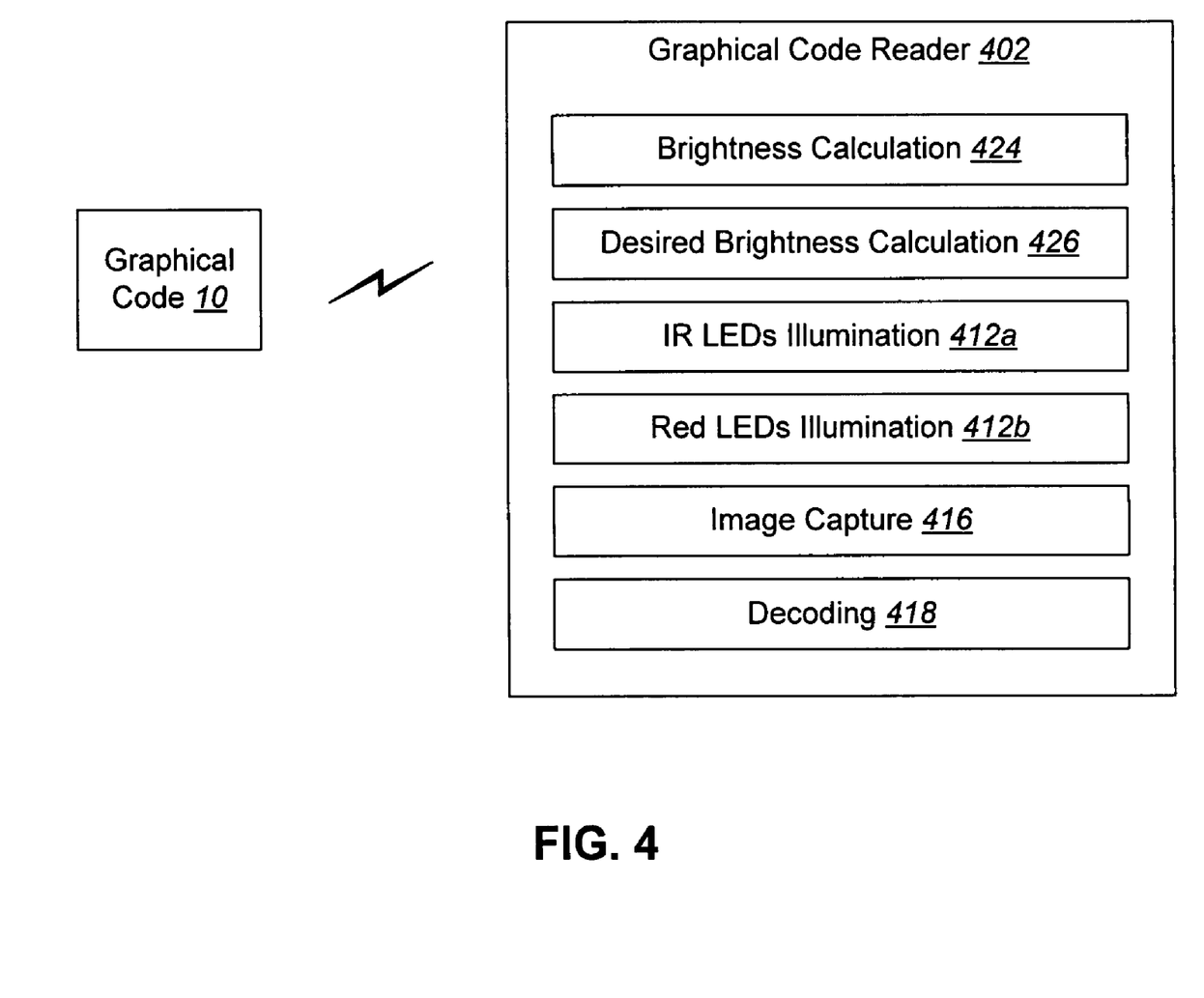
FIG. 4 is a block diagram illustrating software modules in another embodiment of a graphical code reader.

FIG. 4 is a block diagram illustrating software modules in another embodiment of a graphical code reader 402. The graphical code reader 402 includes an image capture module 416 and a decoding module 418. These modules operate similarly to the corresponding modules discussed previously and will not be discussed again in connection with FIG. 4.

The graphical code reader 402 also includes an IR LEDs illumination module 412a and a red LEDs illumination module 412b. As before, the IR LEDs illumination module 412a includes executable instructions for illuminating the IR LEDs 104a, and the red LEDs illumination module 412b includes executable instructions for illuminating the red LEDs 104b. In the illustrated embodiment, the IR illumination intensity level and the red illumination intensity level are determined in accordance with a proportional control algorithm.

As will be discussed in greater detail below, the proportional control algorithm involves determining the actual brightness and the desired brightness of the images that are captured by the reader 402. Consequently, the graphical code reader 402 includes a brightness calculation module 424 and a desired brightness calculation module 426. The brightness calculation module 424 includes executable instructions for determining the brightness of an image. The desired brightness calculation module 426 includes executable instructions for determining the desired brightness of an image. Many examples of different kinds of brightness calculation modules 424 and desired brightness calculation modules 426 are known to those skilled in the art. In some embodiments, determining the desired brightness of a digital image may involve determining the dynamic range of the image and determining a value for the brightness that yields the highest possible dynamic range without clipping.

Figure 5:
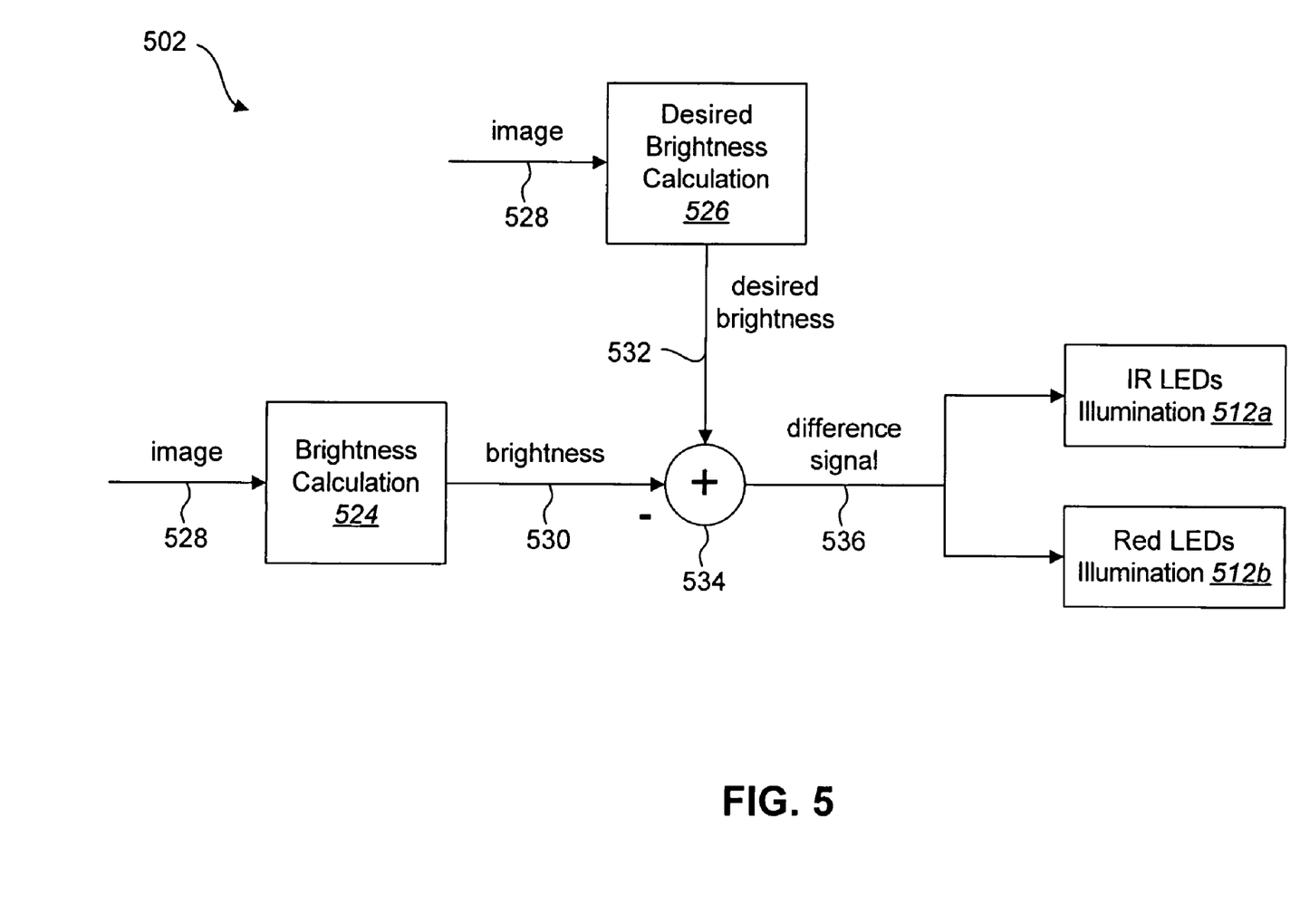
FIG. 5 is a signal flow diagram illustrating exemplary interaction between various software modules in an embodiment of the graphical code reader during typical operation.

FIG. 5 is a signal flow diagram illustrating exemplary interaction between various software modules in an embodiment of the graphical code reader 502 during typical operation. As shown, both the brightness calculation module 524 and the desired brightness calculation module 526 receive an image 528. The brightness calculation module 524 determines the brightness 530 of the image 528. The desired brightness calculation module 526 determines the desired brightness 532 of the image 528.

The brightness 530 and the desired brightness 532 are provided to a summer 534. The summer 534 generates a difference signal 536 which indicates the difference between the brightness 530 of the digital image 528 and the desired brightness 532 of the digital image 528. The difference signal 536 is provided to the IR LEDs illumination module 512a and to the red LEDs illumination module 512b. The IR LEDs illumination module 512a adjusts the IR illumination intensity level in proportion to the difference signal 536. Similarly, the red LEDs illumination module 512b adjusts the red illumination intensity level in proportion to the difference signal 536.

The illumination is only one of the variables that may be changed in order to adjust the brightness of the images that are captured. The gain and the exposure time may also be varied. In some embodiments, to increase the brightness the illumination may be increased first, until the maximum amount of illumination is reached. Then the exposure time may be increased, up to a certain point. Finally, the gain may be increased, up to a certain point.

Figure 6:
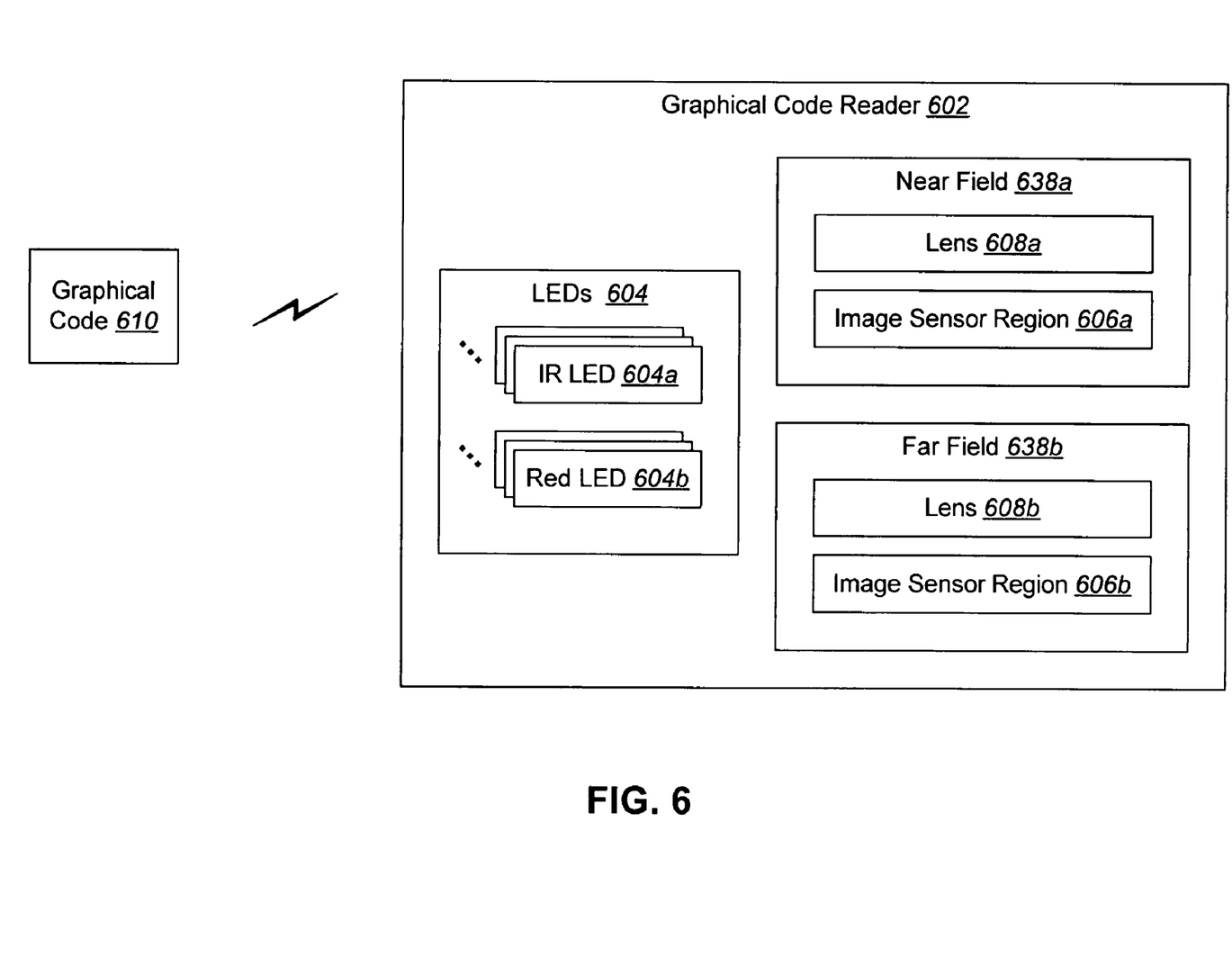
FIG. 6 is a block diagram illustrating physical components in another embodiment of a graphical code reader.

FIG. 6 is a block diagram illustrating physical components in another embodiment of a graphical code reader 602. The graphical code reader 602 includes a plurality of LEDs 604, including one or more IR LEDs 604a and one or more red LEDs 604b. These components operate similarly to the corresponding components discussed previously and will not be discussed again in connection with FIG. 6.

The graphical code reader 602 also includes one or more lenses 608 and one or more image sensor regions 606. The combination of a lens 608 and an image sensor region 606 is sometimes referred to as a field 638. The embodiment of the graphical code reader 602 shown in FIG. 6 includes multiple fields 638 for reading graphical codes 610. More specifically, the graphical code reader 602 includes a near field 638a and a far field 638b. The different fields 638 are configured to read different types of graphical codes 610. The near field 638a is configured to read relatively small, high-density graphical codes 610, such as data matrix codes, MaxiCodes, etc. The far field 638b is configured to read relatively large graphical codes 610, such as bar codes.

The near field 638a includes a near-field lens 608a, and the far field 638b includes a far-field lens 608b. The near-field lens 608a and the far-field lens 608b have substantially identical optical properties. The near-field lens 608a is positioned in front of a near-field image sensor region 606a. The far-fields lens 608b is positioned in front of a far-field image sensor region 606b. In some embodiments, the near-field image sensor region 606a and the far-field image sensor region 606b are located within the same image sensor. Alternatively, the near-field image sensor region 606a and the far-field image sensor region 606b may be located within different image sensors.

Figure 7:
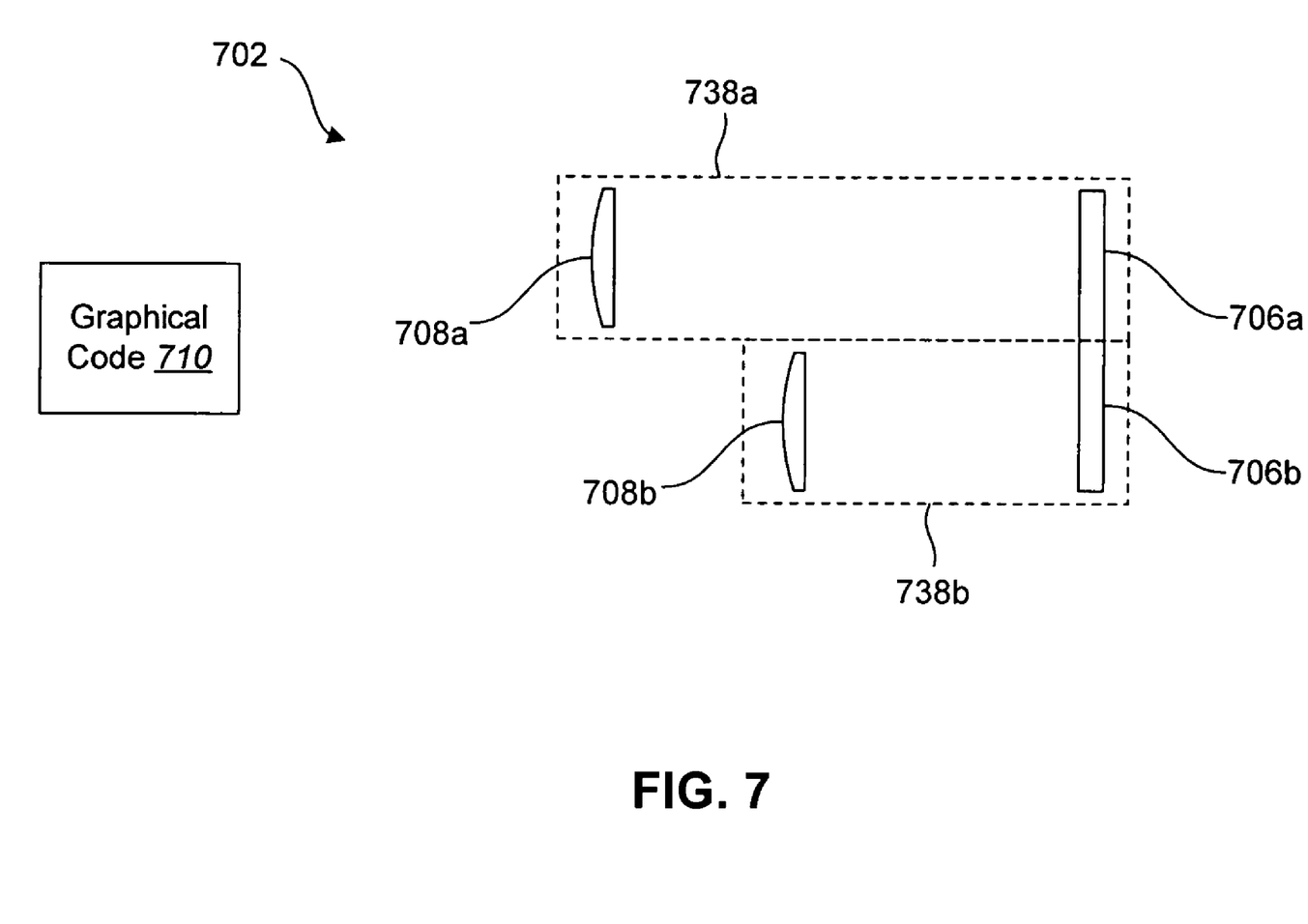
FIG. 7 is a side plan view illustrating the near field and the far field in an embodiment of the graphical code reader.

FIG. 7 is a side plan view illustrating the near field 738a and the far field 738b in an embodiment of the graphical code reader 702. The near-field lens 708a and the near-field image sensor region 706a are shown. Similarly, the far-field lens 708b and the far-field image sensor region 706b are shown.

In typical operation, when the LEDs 104 within the graphical code reader 702 are activated, the graphical code reader 702 is positioned so that illumination from the LEDs 104 is directed toward a graphical code 710. The near-field lens 708a is positioned to focus light reflected from the graphical code 710 onto the near-field image sensor region 706a. The far-field lens 708b is positioned to focus light reflected from the graphical code 710 onto the far-field image sensor region 706b.

As shown, the distance between the near-field lens 708a and the near-field image sensor region 706a is greater than the distance between the far-field lens 708b and the far-field image sensor region 706b. As mentioned previously, the near-field lens 708a and the far-field lens 708b have substantially identical optical properties. Consequently, the resolution of the optical image formed on the near-field image sensor region 706a is greater than the resolution of the optical image formed on the far-field image sensor region 706b. Conversely, the field of view of the optical image formed on the near-field image sensor region 706a is smaller than the field of view of the optical image formed on the far-field image sensor region 706b.

Figure 8:
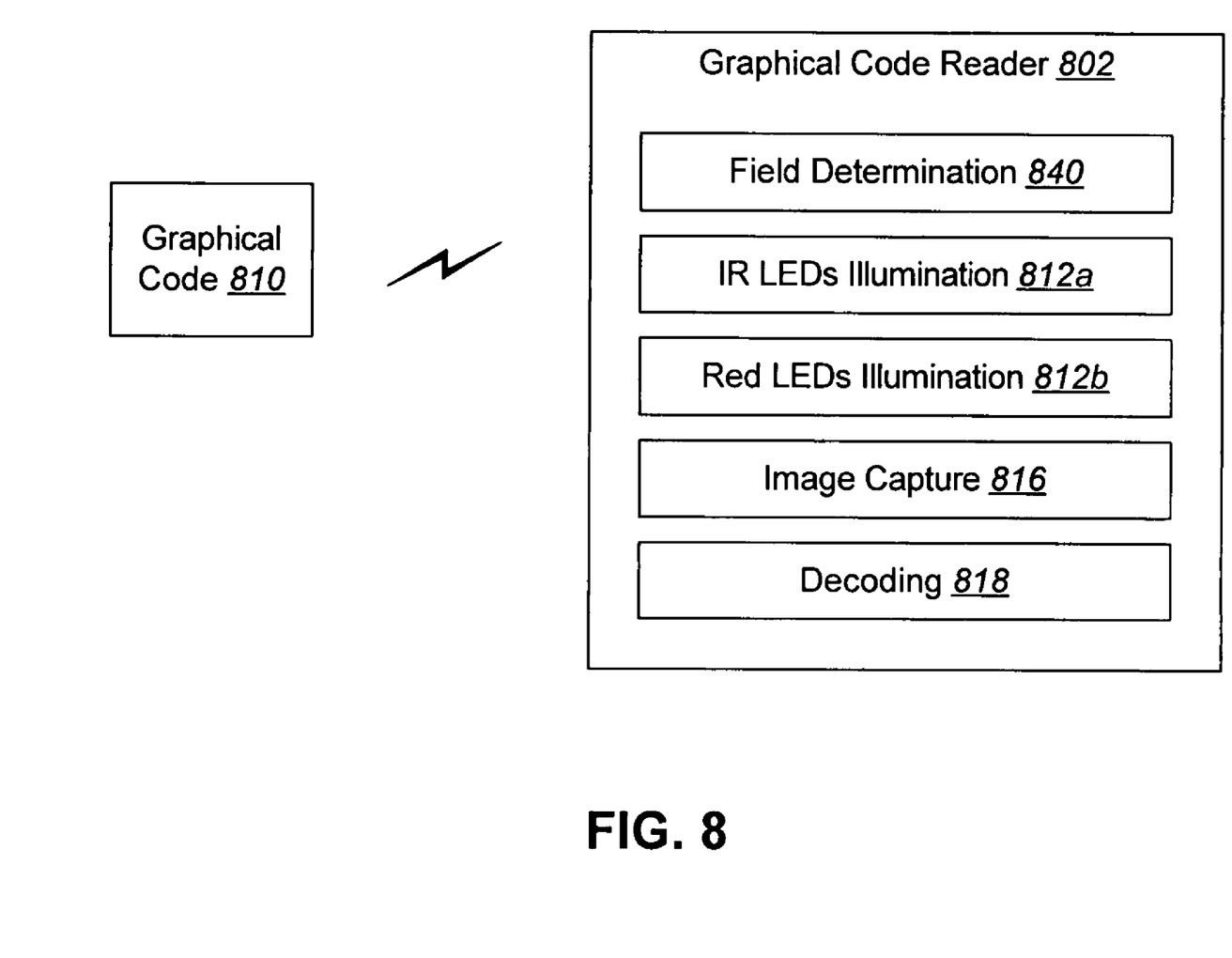
FIG. 8 is a block diagram illustrating software modules in another embodiment of a graphical code reader.

FIG. 8 is a block diagram illustrating software modules in another embodiment of a graphical code reader 802. The graphical code reader 802 includes an image capture module 816 and a decoding module 818. These modules operate similarly to the corresponding modules discussed previously and will not be discussed again in connection with FIG. 8.

The graphical code reader 802 also includes an IR LEDs illumination module 812a and a red LEDs illumination module 812b. As before, the IR LEDs illumination module 812a includes executable instructions for illuminating the IR LEDs 104a in the graphical code reader 802, and the red LEDs illumination module 812b includes executable instructions for illuminating the red LEDs 104b in the reader 802. In the illustrated embodiment, the IR illumination intensity level and the red illumination intensity level are determined, at least in part, based on the field 638 that is being used to read the graphical code 810. Consequently, the graphical code reader 802 also includes a field determination module 840. The field determination module 840 includes executable instructions for determining which of the near field 638a and the far field 638b is being used to read the current graphical code 810. In some embodiments, this determination is made by processing an image to determine whether a graphical code 810 is located in the portion of the image corresponding to the near-field image sensor region 606a or the portion of the image corresponding to the far-field image sensor region 606b. In making this determination, the image quality is typically considered, including the contrast, dynamic range, absence of clipping, and so forth. In typical embodiments, if one field has good quality, the field with the better quality is the active field. However, if both fields have poor quality, then the far field is the active field if both fields are dark, and the near field is the active field if both fields are bright.

Figure 9:
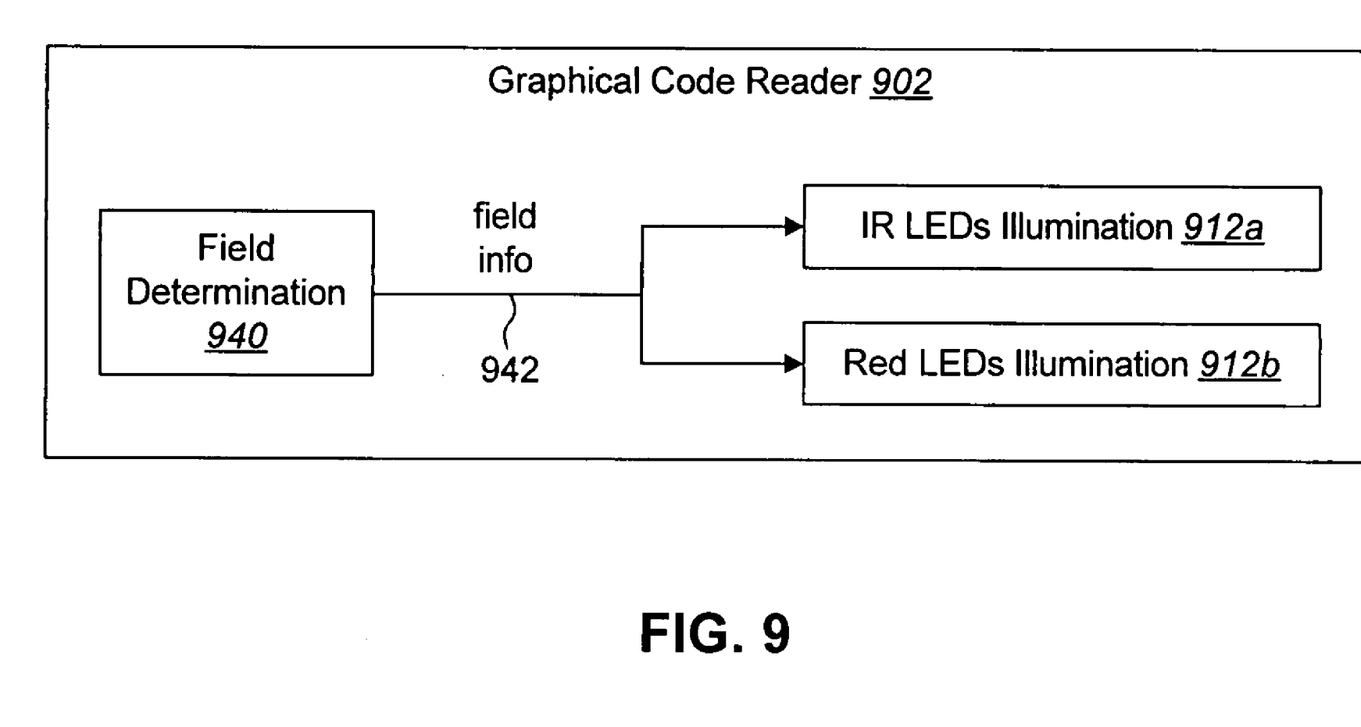
FIG. 9 is a signal flow diagram illustrating exemplary interaction between various software modules in an embodiment of the graphical code reader during typical operation.

FIG. 9 is a signal flow diagram illustrating exemplary interaction between various software modules in an embodiment of the graphical code reader 902 during typical operation. The field determination module 940 determines field information 942 which indicates which of the near field 638a and the far field 638b is being used to read the current graphical code 110. The field determination module 940 provides the field information 942 to the IR LEDs illumination module 912a and to the red LEDs illumination module 912b. The IR LEDs illumination module 912a sets the IR illumination intensity level and the red LEDs illumination module 912b sets the red illumination intensity level based, at least in part, on the field information 942 that is received.

In typical operation, if the near field 638a is being used to read a graphical code 110, the IR illumination intensity level is reduced below the red illumination intensity level, perhaps even to zero. The red LEDs 104b provide adequate illumination for the near field 638a because the near-field lens 608a is relatively close to the graphical code 110. Accordingly, the red illumination may be allowed to dominate when the near field 638a is being used. If the far field 638b is being used to read a graphical code 110, the IR illumination intensity level is increased. The red illumination intensity level may also be increased. At the farther range, the red illumination may not be strong enough to be reflected back to the far field 638b, but there is still a significant amount of IR illumination that is reflected back to the far field 638b. Accordingly, the IR illumination dominates when the far field 638b is being used.

The foregoing discussion included a description of several techniques for varying the brightness of an image that is captured in a graphical code reader. An exemplary technique was described for varying the brightness of an image based on user input. Another exemplary technique was described for varying the brightness in accordance with a proportional control algorithm. Another exemplary technique was described for varying the brightness based on the field that is being used to read the current graphical code. Some or all of the techniques described herein may be combined in some embodiments. For example, the IR illumination intensity level and the red illumination intensity level may be determined based in part on user input, in part on a proportional control algorithm, and in part on the field that is being used to read the current graphical code.

Figure 10:
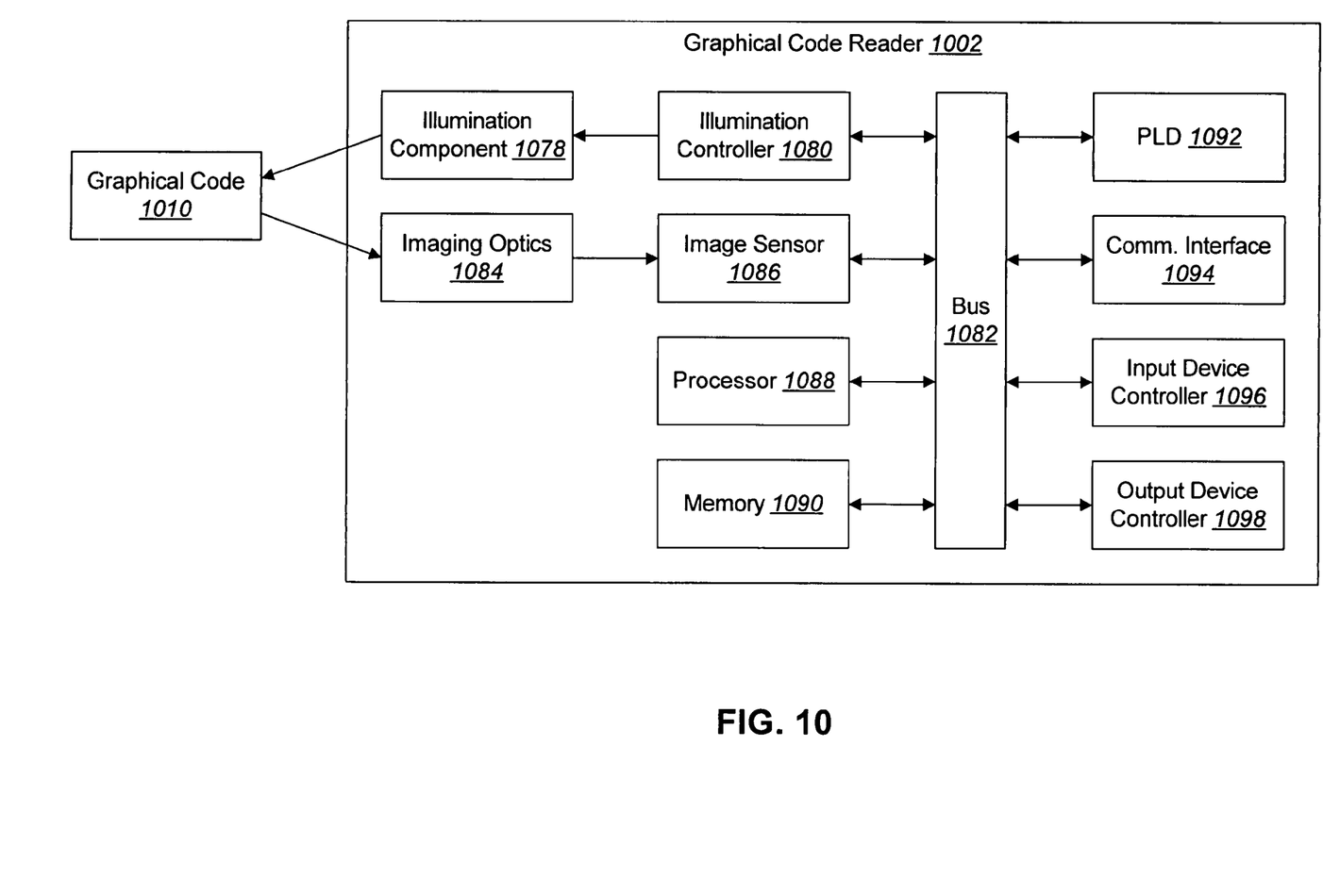
FIG. 10 is a block diagram illustrating physical components in an embodiment of a graphical code reader.

FIG. 10 is a block diagram illustrating physical components in an embodiment of a graphical code reader 1002. The different components may be located within the same physical structure or in separate physical structures.

The graphical code reader 1002 includes an illumination component 1078. The illumination component 1078 typically includes a plurality of LEDs 104, including one or more IR LEDs 104a and one or more red LEDs 104b, as described previously. The LEDs 104 may be activated to illuminate a graphical code 1010. The illumination component 1078 is controlled by an illumination controller 1080, which is in electronic communication with other components in the graphical code reader 1002 via a system bus 1082.

The graphical code reader 1002 also includes imaging optics 1084 and an image sensor 1086. The image sensor 1086 includes a plurality of light-sensitive elements. The imaging optics 1084 focus light reflected from the area illuminated by the illumination component 1078 onto the image sensor 1086. A housing (not shown) is typically also provided for shielding the light-sensitive elements in the image sensor 1086 from ambient light. The image sensor 1086 is in electronic communication with other components in the graphical code reader 1002 via the system bus 1082.

The graphical code reader 1002 also includes a processor 1088 and memory 1090. The processor 1088 controls the operation of the graphical code reader 1002 and may be embodied as a microprocessor, a microcontroller, a digital signal processor (DSP) or other device known in the art. The processor 1088 typically performs logical and arithmetic operations based on program instructions stored within the memory 1090.

As used herein, the term "memory" 1090 is broadly defined as any electronic component capable of storing electronic information, and may be embodied as read only memory (ROM), random access memory (RAM), magnetic disk storage media, optical storage media, flash memory devices in RAM, on-board memory included with the processor 1088, EPROM memory, EEPROM memory, registers, etc. The memory 1090 typically stores program instructions and other types of data. The program instructions may be executed by the processor 1088 to implement some or all of the methods disclosed herein. The processor 1088 and memory 1090 are in electronic communication with other components in the graphical code reader 1002 via the system bus 1082.

The graphical code reader 1002 typically also includes one or more programmable logic devices (PLDs) 1092. The PLDs 1092 may be programmed to carry out logic functions that implement, either partially or completely, some or all of the methods disclosed herein. Examples of different types of PLDs 1092 that may be used include field-programmable gate arrays (FPGAs), logic-cell arrays (LCAs), programmed arrays of logic (PALs), complex programmable-logic devices (CPLDs), and so forth. The PLDs 1092 are in electronic communication with other components in the graphical code reader 1002 via the system bus 1082. Those skilled in the art will recognize that one or more application-specific integrated circuits (ASICs) may be used in place of or in addition to the PLDs 1092.

The graphical code reader 1002 typically also includes one or more communication interfaces 1094 for communicating with other electronic devices. The communication interfaces 1094 may be based on wired communication technology, wireless communication technology, or both. Examples of different types of communication interfaces 1094 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, and so forth. The communication interfaces 1094 are in electronic communication with other components in the graphical code reader 1002 via the system bus 1082.

The graphical code reader 1002 typically also includes one or more input device controllers 1096 for controlling input devices, such as keys, buttons, etc. The graphical code reader 1002 typically also includes one or more output device controllers 1098 for controlling output devices, such as a display screen. The input device controllers 1096 and output device controllers 1098 are in electronic communication with other components in the graphical code reader 1002 via the system bus 1082.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A graphical code reader, comprising:
    an infrared light-emitting diode;
    a red light-emitting diode;
    an image sensor;
    a lens positioned to focus reflected light on the image sensor;
    a processor;
    memory in electronic communication with the processor; and
    instructions stored in the memory, the instructions being executable by the processor to implement a method comprising:
        illuminating the infrared light-emitting diode at an infrared illumination intensity level;
        illuminating the red light-emitting diode at a red illumination intensity level;
        capturing a digital image for processing, the digital image being an electronic representation of an optical image formed on the image sensor; and
        processing the digital image to attempt to decode a graphical code within the digital image,
    wherein the graphical code reader is configured such that the user can set the infrared illumination intensity level and the red illumination intensity level.

2. The graphical code reader of claim 1, wherein the method further comprises:

detecting user input;
obtaining illumination information from the user input;
setting the infrared illumination intensity level in accordance with the illumination information; and
setting the red illumination intensity level in accordance with the illumination information.

3. The graphical code reader of claim 1, wherein the infrared light-emitting diode emits infrared light having a wavelength band that is substantially centered at 700 nanometers.

4. The graphical code reader of claim 1, wherein the infrared light-emitting diode emits infrared light having a wavelength band that is substantially centered at 735 nanometers.

5. The graphical code reader of claim 1, wherein the red light-emitting diode emits infrared light having a wavelength band that is substantially centered at 660 nanometers.

6. A graphical code reader, comprising:
an infrared light-emitting diode;
a red light-emitting diode;
an image sensor;
a lens positioned to focus reflected light on the image sensor;
a processor;
memory in electronic communication with the processor; and
instructions stored in the memory, the instructions being executable by the processor to implement a method comprising:
   illuminating the infrared light-emitting diode at an infrared illumination intensity level;
   illuminating the red light-emitting diode at a red illumination intensity level;
   capturing a digital image for processing, the digital image being an electronic representation of an optical image formed on the image sensor; and
   processing the digital image to attempt to decode a graphical code within the digital image, wherein the method further comprises;
   determining a brightness of the digital image;
   determining a desired brightness of the digital image;
   determining a difference signal which indicates a difference between the brightness of the image and the desired brightness of the digital image;
   adjusting the infrared illumination intensity level in proportion to the difference signal; and
   adjusting the red illumination intensity level in proportion to the difference signal.

7. A graphical code reader, comprising:
an infrared light-emitting diode;
a red light-emitting diode;
a near field that includes a near-field image sensor region and a near-field lens positioned to focus first reflected light on the near-field image sensor region;
a far field that includes a far-field image sensor region and a far-field lens positioned to focus second reflected light on the far-field image sensor region, and wherein a first distance between the near-field lens and the near-field image sensor region is greater than a second distance between the far-field lens and the far-field image sensor region;
a processor;
memory in electronic communication with the processor; and
instructions stored in the memory, the instructions being executable by the processor to implement a method comprising:
   illuminating the infrared light-emitting diode at an infrared illumination intensity level;
   illuminating the red light-emitting diode at a red illumination intensity level;
   obtaining a digital image, the digital image being an electronic representation of an optical image formed on at least one of the near-field image sensor region and the far-field image sensor region; and
   processing the digital image to attempt to decode a graphical code within the digital image.

8. The graphical code reader of claim 7, wherein the method further comprises:
determining which of the near field and the far field is being used to read the graphical code; and
reducing the infrared illumination intensity level below the red illumination intensity level if the near field is being used to read the graphical code.

9. The graphical code reader of claim 7, wherein the method further comprises:
determining which of the near field and the far field is being used to read the graphical code; and
increasing the infrared illumination intensity level if the far field is being used to read the graphical code.

10. In a graphical code reader, a method comprising:
illuminating an infrared light-emitting diode at an infrared illumination intensity level;
illuminating a red light-emitting diode at a red illumination intensity level;
capturing a digital image for processing, the digital image being an electronic representation of an optical image formed on an image sensor; and
processing the digital image to attempt to decode a graphical code within the digital image, wherein the graphical code reader is configured such that the user can set the infrared illumination intensity level and the red illumination intensity level.

11. The method of claim 10, further comprising:
detecting user input;
obtaining illumination information from the user input;
setting the infrared illumination intensity level in accordance with the illumination information; and
setting the red illumination intensity level in accordance with the illumination information.

12. The method of claim 10, wherein the infrared light-emitting diode emits infrared light having a wavelength band that is substantially centered at 700 nanometers.

13. The method of claim 10, wherein the infrared light-emitting diode emits infrared light having a wavelength band that is substantially centered at 735 nanometers.

14. The method of claim 10, wherein the red light-emitting diode emits infrared light having a wavelength band that is substantially centered at 660 nanometers.

15. In a graphical code reader, a method comprising:
illuminating an infrared light-emitting diode at an infrared illumination intensity level;
illuminating a red light-emitting diode at a red illumination intensity level;
capturing a digital image for processing, the digital image being an electronic representation of an optical image formed on an image sensor;
processing the digital image to attempt to decode a graphical code within the digital image;
determining a brightness of the digital image;
determining a desired brightness of the digital image;
determining a difference signal which indicates a difference between the brightness of the image and the desired brightness of the digital image;

adjusting the infrared illumination intensity level in proportion to the difference signal; and adjusting the red illumination intensity level in proportion to the difference signal.

16. In a graphical code reader comprising a near field and a far field, the near field including a near-field image sensor region and a near-field lens positioned to focus first reflected light on the near-field image sensor region, and the far field including a far-field image sensor region and a far-field lens positioned to focus second reflected light on the far-field image sensor region, a method comprising:

illuminating an infrared light-emitting diode at an infrared illumination intensity level;

illuminating a red light-emitting diode at a red illumination intensity level;

obtaining a digital image, the digital image being an electronic representation of an optical image formed on at least one of the near-field image sensor region and the far-field image sensor region; and processing the digital image to attempt to decode a graphical code within the digital image, wherein a first distance between the near-field lens and the near-field image sensor region is greater than a second distance between the far-field lens and the far-field image sensor region.

17. The method of claim 16, further comprising:

determining which of the near field and the far field is being used to read the graphical code; and reducing the infrared illumination intensity level below the red illumination intensity level if the near field is being used to read the graphical code.

18. The method of claim 16, further comprising:

determining which of the near field and the far field is being used to read the graphical code; and increasing the infrared illumination intensity level if the far field is being used to read the graphical code.

* * * * *